(12) United States Patent
Grek et al.

(10) Patent No.: US 7,440,655 B2
(45) Date of Patent: Oct. 21, 2008

(54) DUPLEX ARRAYED WAVEGUIDE GRATING

(75) Inventors: Boris Grek, Hayward, CA (US); Saurav Das, Fremont, CA (US)

(73) Assignee: ANDevices, Inc., Fremont, CA (US)

( * ) Notice: Subject to any disclaimer, the term of this patent is extended or adjusted under 35 U.S.C. 154(b) by 0 days.

(21) Appl. No.: 11/232,752

(22) Filed: Sep. 21, 2005

(65) Prior Publication Data
US 2007/0065076 A1   Mar. 22, 2007

(51) Int. Cl.
*G02B 6/34* (2006.01)
(52) U.S. Cl. ........................................ 385/37
(58) Field of Classification Search ............ 385/10, 385/16–24, 37–46, 129–130, 142–144
See application file for complete search history.

(56) References Cited

U.S. PATENT DOCUMENTS 6,069,990 A * 5/2000 Okawa et al. ............... 385/43
6,434,292 B1 * 8/2002 Kim et al. ................... 385/24
6,678,446 B1 * 1/2004 McGreer et al. ............. 385/37

* cited by examiner

*Primary Examiner*—Quyen P Leung
(74) *Attorney, Agent, or Firm*—MacPherson Kwok Chen & Heid LLP (57) ABSTRACT

An optical device that includes an input region, an output region, and an arrayed waveguide grating between the input region and the output region is presented. The input region includes a first input waveguide set and a second input waveguide set, and the output region includes a first output waveguide set and a second output waveguide set. The arrayed waveguide grating is shared by the signals that travel from the input region to the output region. The device is capable of simultaneously functioning as a multiplexer and a demultiplexer, thereby reducing the cost and complexity of a dual-function optical device. Where the arrayed waveguide grating is used for multiplexing, the optical device receives demultiplexed input signals and generates a multiplexed signal. Where the arrayed waveguide grating is used for demultiplexing, the optical device receives a multiplexed input signal and generates a set of demultiplexed signals.

28 Claims, 8 Drawing Sheets

FIG. 9D Y BRANCH

FIG. 9C PARABOLIC TAPER

FIG. 9B LINEAR TAPER

FIG. 9A MMI

DUPLEX ARRAYED WAVEGUIDE GRATING

FIELD OF INVENTION

This invention pertains generally to integrated optics/planar lightwave circuits (PLC) and particularly to integrated optics/PLC-based Arrayed Waveguide Grating (AWG) devices used as multiplexers/demultiplexers in optical communication networks.

BACKGROUND

Optical networks form the backbone of today's telecom and datacom networks. Optical networks exploit the high-transmission capacity of optical fibers by transmitting data over multiple wavelengths simultaneously, similarly to FM radio channels that are transmitted over several frequencies in the 88 to 108 MHz range. The optical frequencies (or wavelengths) in these networks, which are known as Wavelength Division Multiplexed (WDM) networks, are spaced equally (e.g., by 50 Ghz, or by 100 Ghz, etc.) in the frequency domain. The frequencies themselves (in the 195 THz range) are defined by standards set by the International Telecommunications Union (ITU).

Figure 1:
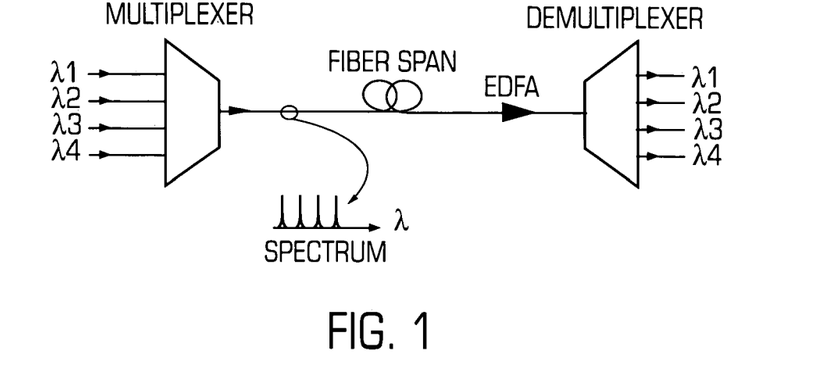
FIG. 1 illustrates a point-to-point network over a long-haul WDM network.

Optical networks can be classified broadly into 3 categories: 1) long-haul networks that exist between cities or continents, 2) metro networks that exist within a city, and 3) access networks that typically provide service to residential or business customers. FIG. 1 illustrates a point-to-point link over a long-haul WDM network in which multiple wavelength channels are multiplexed (MUX) together and transmitted over an optical fiber. At the receiving end, the signal is demultiplexed (deMUX) to its constituent wavelengths. These MUX/deMUX operations are performed by optical filters such as Bragg gratings, Thin-film filters (TFF) and AWGs. Over the last few years, as the number of channels transmitted has increased from 4 to 40, AWGs have become the preferred option for filter devices. In recent years, even in the metro network area, there has been a lot of activity in providing increased capacity by increasing the number of channels that are part of a metro ring.

However, in the metro market, there is also the need to dynamically provide bandwidth while maintaining low costs. Setting up and tearing down high-capacity optical wavelength connections for business service transport has been hamstrung by the exorbitant costs of manual configuration. Hence, low-cost reconfigurable optical add/drop multiplexing (ROADM) products are now being introduced for the Metro market. ROADMs give network administrators the ability to select, via software, which of the WDM channels to add, drop or pass-through at each site in a WDM network, thus allowing seamless addition of services as end-user demand necessitates.

Figure 2:
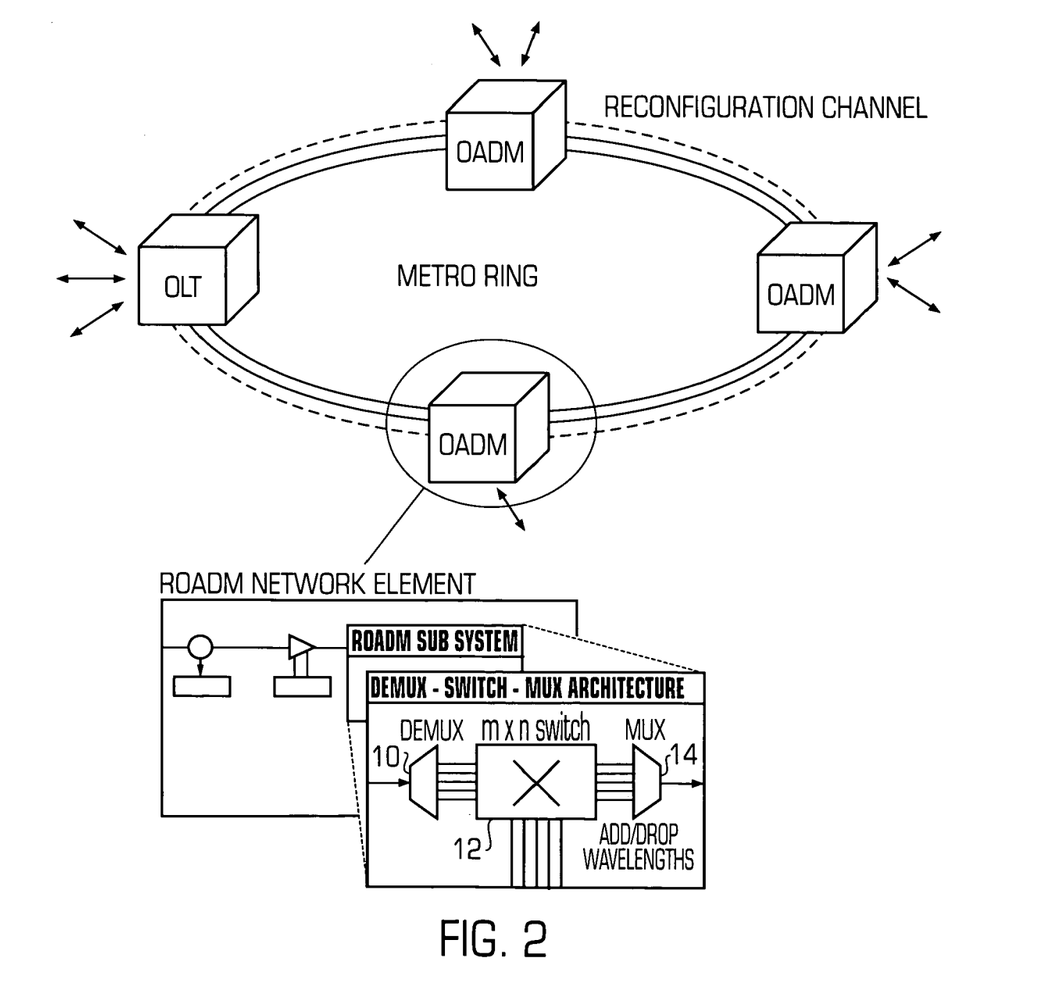
FIG. 2 is an illustration of an ROADM architecture.

FIG. 2 illustrates a ROADM architecture that shares three functional elements: a demultiplexer 10, a switching element 12, and a multiplexer 14. The switching element 12 selects which wavelength can be added or dropped at any given port. AWGs may be used for the multiplexer and demultiplxer operations in this ROADM architecture.

Figure 3:
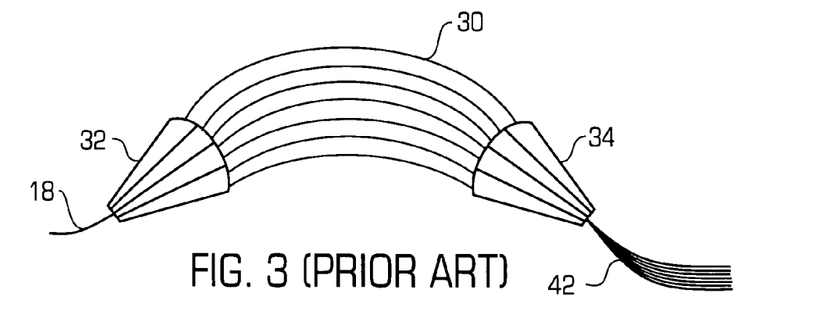
FIG. 3 illustrates a conventional AWG.

FIG. 3 illustrates a typical AWG 20 that is currently available. AWGs, sometimes referred to as "PHASARS," are well known components in the optical communications industry. An AWG is an integrated optics planar waveguide structure that acts like a bulk diffraction grating in a spectrometer. The construction and operation of such AWGs are well known in the art. The embodiment of FIG. 3 consists of an array of channel waveguides 30 that connect an input Free Propagation Region (FPR) 32 to the output FPR 34. There are also sets of input waveguides 18, which carry the light to the input FPR 32, and another set of output waveguides 42 that carry the light out from the output FPR 34. The FPR is sometimes referred to as a slab waveguide. In an FPR, an optical beam is confined in only one direction (vertical) as opposed to two directions as in a channel waveguide.

The arrayed waveguide grating region 30 consists of channel waveguides that are of varying length. The waveguides vary in length by increments of $\Delta L$ such that, if there were seven waveguides, their lengths would be $x+3\Delta L$, $x+2\Delta L$, $x+\Delta L$, $x$, $x-\Delta L$, $x-2\Delta L$, and $x-3\Delta L$. Different wavelengths traveling through the array experience different amounts of time delay. The interference and diffraction caused by the different amounts of delay in each waveguide causes the radiation components having different wavelengths to emerge at different angles from the output end of the array waveguide grating region 30.

When used as a demultiplexer, the signal enters through one of the input waveguides 18 carrying all the wavelength signals, which separate after passing through the arrayed waveguide grating region 30 and the output FPR 34. The output waveguides 42 are placed at an are known as the grating circle or the Rowland circle, where the constituent wavelengths of the signal focus separately such that each output waveguide carries a separate signal wavelength.

When used as a multiplexer, all the separate signal wavelengths enter the device through multiple input waveguides 18, pass through the arrayed waveguide grating region 30 and focus at the same Rowland circle point in the output FPR 34. The output waveguide 42 placed at this focus point then carries the signal away to couple to an optical fiber (not shown) with all the wavelength signals multiplexed together.

In theory, a single AWG 20 can be used both as a Mux as well as a De-Mux due to its bi-directional nature. However, in practice, a single AWG 20 is never used to perform both functions simultaneously because optical communication system vendors have very different requirements for the performance of AWG filters when used as a MUX and when used as a deMUX. A spectral filter is characterized by its spectral passband shape, as well as other parameters such as loss and crosstalk to other channels.

The AWG 20, when used to de-multiplex wavelengths that are 100 GHz apart (~0.8 nm), requires a passband spectral width of 0.2 nm 1 dB down from the peak transmission and a Full width at Half Maximum (FWHM-or 3 dB down from peak transmission) of 0.4 nm. Crosstalk characteristics are also important and typical numbers for adjacent channel crosstalk require the power of a signal in its neighboring channels to be 25 dB below the peak transmission in the channel. This is known in the art as a Gaussian-shaped spectral passband.

Figure 4A:
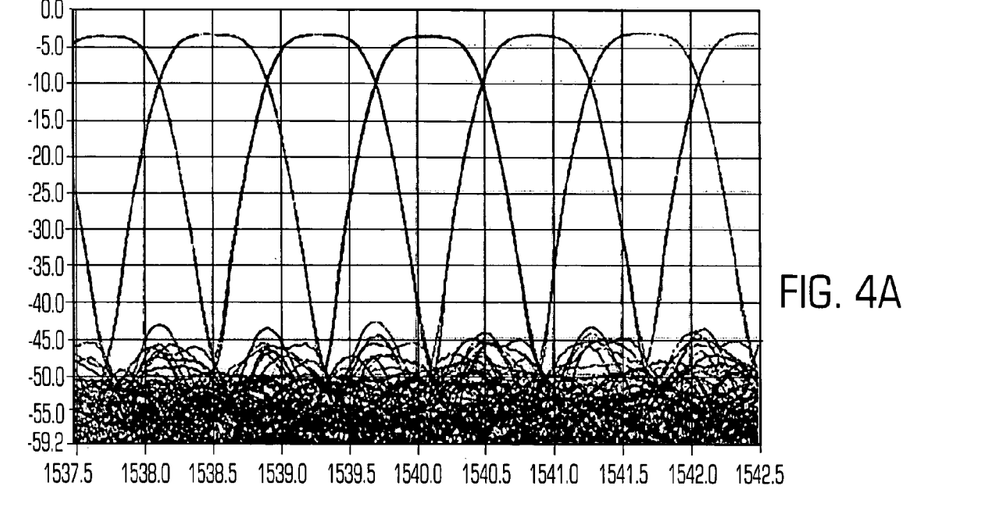
FIGS. 4A and 4B show exemplary spectral passband shapes for deMUX and MUX signals, respectively.
Figure 4B:
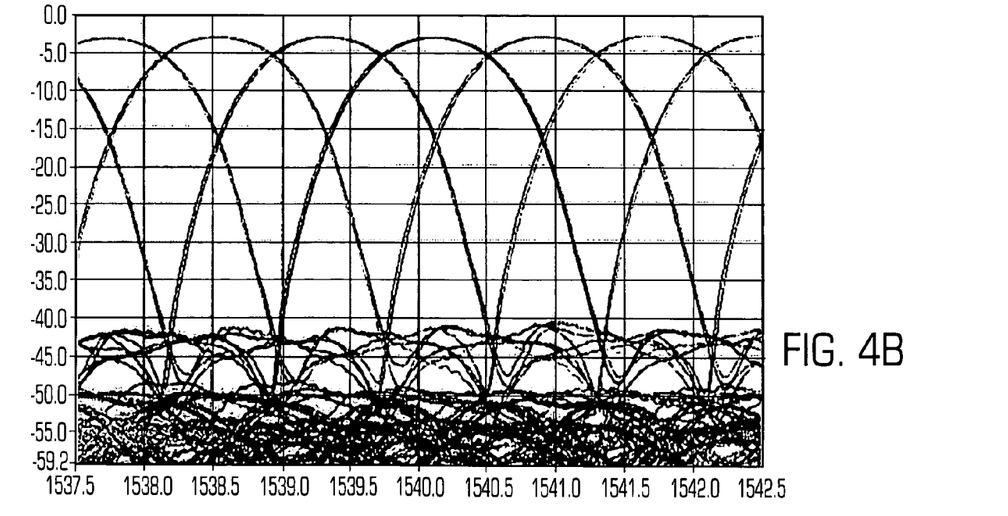

FIGS. 4A and 4B show exemplary spectral passband shapes of the filter through which the deMUX and MUX signals pass, respectively. In both figures, the x-axis indicates the wavelength in nm and the y-axis indicates the loss in dB. Generally, it is desirable for the AWG deMUX spectral passband filter to have a flat-topped passband shape with sharper slopes than what a Gaussian passband would offer. This is because a Gaussian passband requires tight control over drift of the wavelengths emitted from the lasers, making it difficult to use in transmission systems. As shown, the deMUX requirements for 1 dB and 3 dB passbands are 0.4 nm and 0.6 nm, respectively, along with an adjacent channel crosstalk of 25 dB. This is known in the art as a flat-top passband.

In contrast, the MUX requirements for 1 dB and 3 dB passband are 0.5 nm and 0.8 nm, respectively, while there is no crosstalk specification (as the signals are mixed together anyway). As shown, the passband shape for a MUX device is wide-band Gaussian. Due to the different passband shapes, two substantially different AWG designs have to be used for the Mux and Demux devices.

Figure 5A:
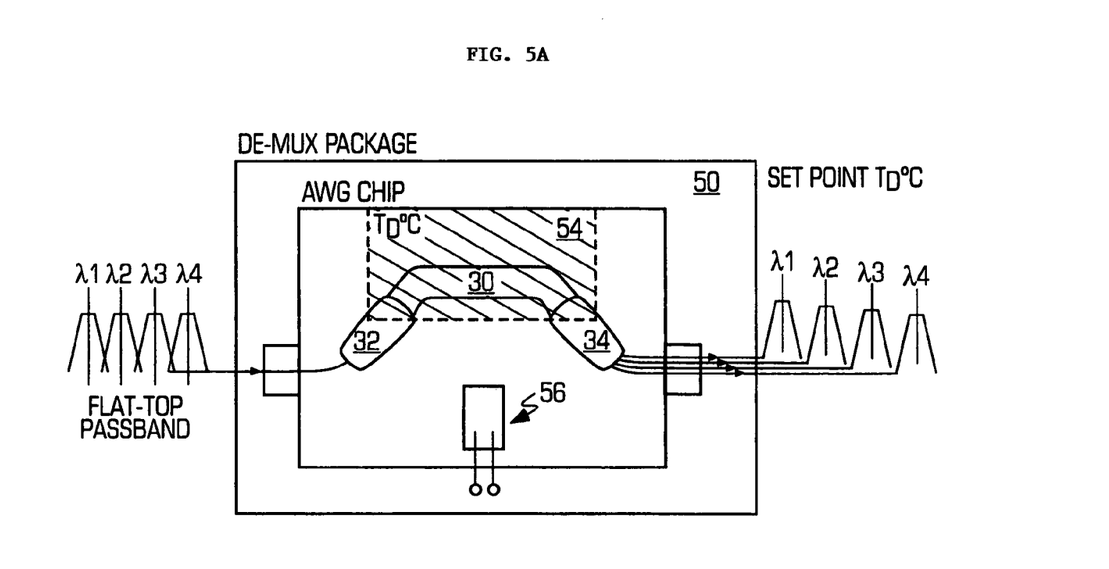
FIGS. 5A and 5B illustrate a MUX/deMUX device wherein the MUX and deMUX circuits are in separate packages.
Figure 5B:
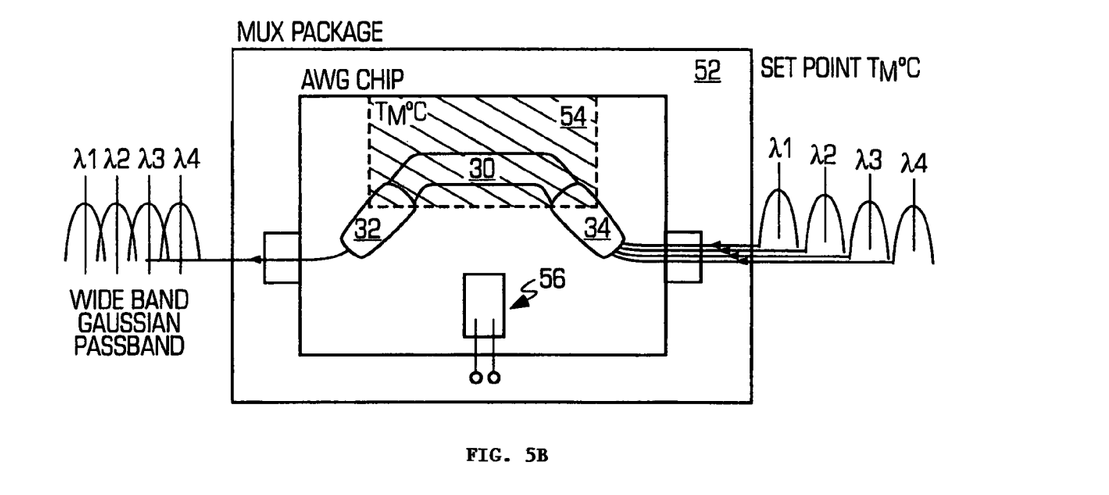

FIGS. 5A and 5B illustrate a MUX/deMUX device in separate packages as a deMUX package 50 and a MUX package 52, each package having a separate AWG unit. Essentially, any network system requiring a MUX and a deMUX would require two separate AWG units, each specifically designed to the different specifications of passband shape and packaged separately even though they would operate over the same wavelengths. Each packaged device 50, 52 typically consists of the AWG circuit bonded to fiber arrays which couple the light into and out of the circuit, a heater/TEC 54 and a temperature sensor 56 like an RTD or thermistor. The AWG is a temperature-sensitive device inasmuch as the passband wavelengths can drift with ambient temperature. Hence, the AWG is temperature-controlled (external to the package) by a controller, which is typically in a system card. The system card reads the sensor's temperature and adjusts the heater/TEC 54 accordingly. Each of the packaged devices 50, 52 includes the arrayed waveguide grating region 30 between an input FPR 32 and an output FPR 34. Since MUX and deMUX are in separate packages that may or may not have different temperature set points, the card that controls each of the AWG packages 50, 52 include two separate controllers and spaces for two AWG packages. This substantially increases the footprint of the network system and also affects cost and complexity.

Figure 6A:
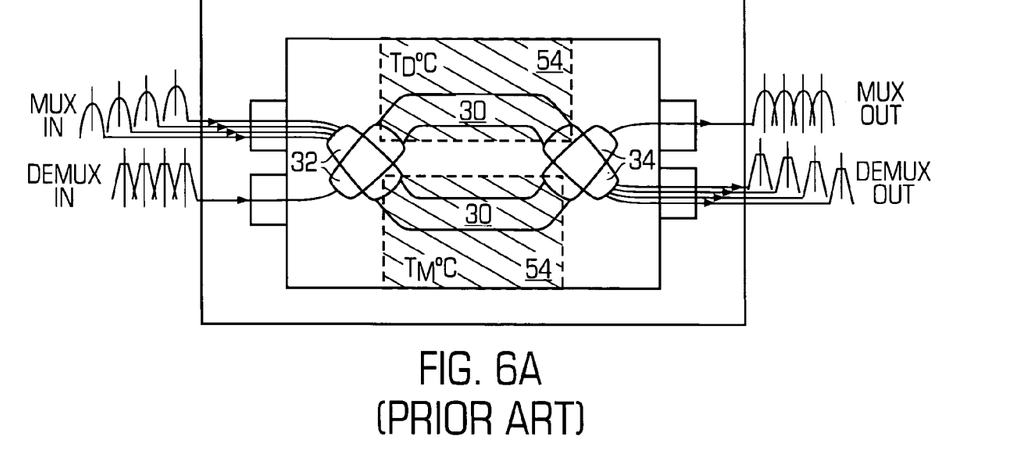
FIGS. 6A and 6B illustrate two embodiments of a MUX/deMUX devices in which the MUX and deMUX circuits are housed in the same package.
Figure 6B:
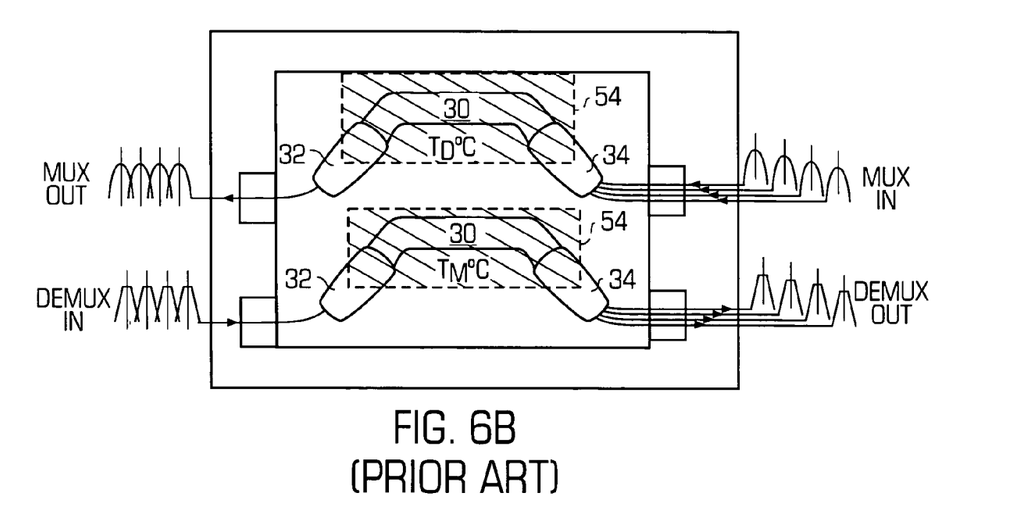

FIGS. 6A and 6B illustrate different embodiments of a MUX/deMUX device 60 wherein the MUX and deMUX circuits are housed in the same AWG package. In this case, the AWG temperatures may have to be controlled separately as they may have different set points. In some cases, the network system customer may require the AWG package to have internally-built temperature controllers that require no external control logic in the system card. In such a case, the packaging becomes more complicated and the package footprint grows larger due to the need for two controller circuits.

Overall, both the separately-packaged device of FIGS. 5A and 5B and the single-package embodiment of FIG. 6 have the problem of needing two different AWGs with different spectral characteristics for MUX and DeMUX while using the same operating wavelengths. Also, both embodiments pose packaging complexities of controlling the different set-point temperature of the two devices/circuits, leading to larger footprints and higher costs.

SUMMARY

In one aspect, the invention is an optical device that includes an input region, an output region, and an arrayed waveguide grating between the input region and the output region. The input region includes a first input waveguide set and a second input waveguide set, wherein each of the first and second input waveguide set has at least one input waveguide. The output region includes a first output waveguide set and a second output waveguide set, wherein each of the first and second output waveguide set has at least one output waveguide. The arrayed waveguide grating is shared by the signals that travel from the input region to the output region.

In another aspect, the invention is a method of making an optical device. The method entails forming an input region, forming an output region, and forming an arrayed waveguide grating. The input region includes a first input waveguide set and a second input waveguide set, wherein each of the first and second input waveguide set has at least one input waveguide. The output region includes a first output waveguide set and a second output waveguide set, wherein each of the first and second output waveguide set has at least one output waveguide. The arrayed waveguide grating is formed between the input region and the output region, such that signals that travel from the input region to the output region share the arrayed waveguide grating.

In yet another aspect, the invention is an optical device that includes a first input waveguide set that receives demultiplexed input signals, a second input waveguide set that receives a multiplexed input signal, and an arrayed waveguide grating. The arrayed waveguide grating multiplexes the demultiplexed input signals to form a multiplexed output signal and demultiplexes the multiplexed input signal to form demultiplexed output signals.

DETAILED DESCRIPTION OF THE EMBODIMENT(S)

The invention concerns the sharing of the arrayed waveguide region between two devices performing different functions such as multiplexing and demultiplexing of optical communication channels. The invention overcomes the problems associated with needing two sets of AWGs 20 for a MUX/deMUX device by taking advantage of the fact that in the AWG design, the spectral shape and the passband wavelengths at the center of each spectral shape can be individually controlled. The center wavelength of the spectral shapes can be controlled by designing the grating parameters appropriately to achieve the wavelengths of interest (typically the ITU grid) and their spacing (typically 50 Ghz, 100 Ghz, etc.), while the spectral shape is a function of mode shaping features which are constructed at the input and output waveguides and are relatively independent of the grating parameters.

Figure 7:
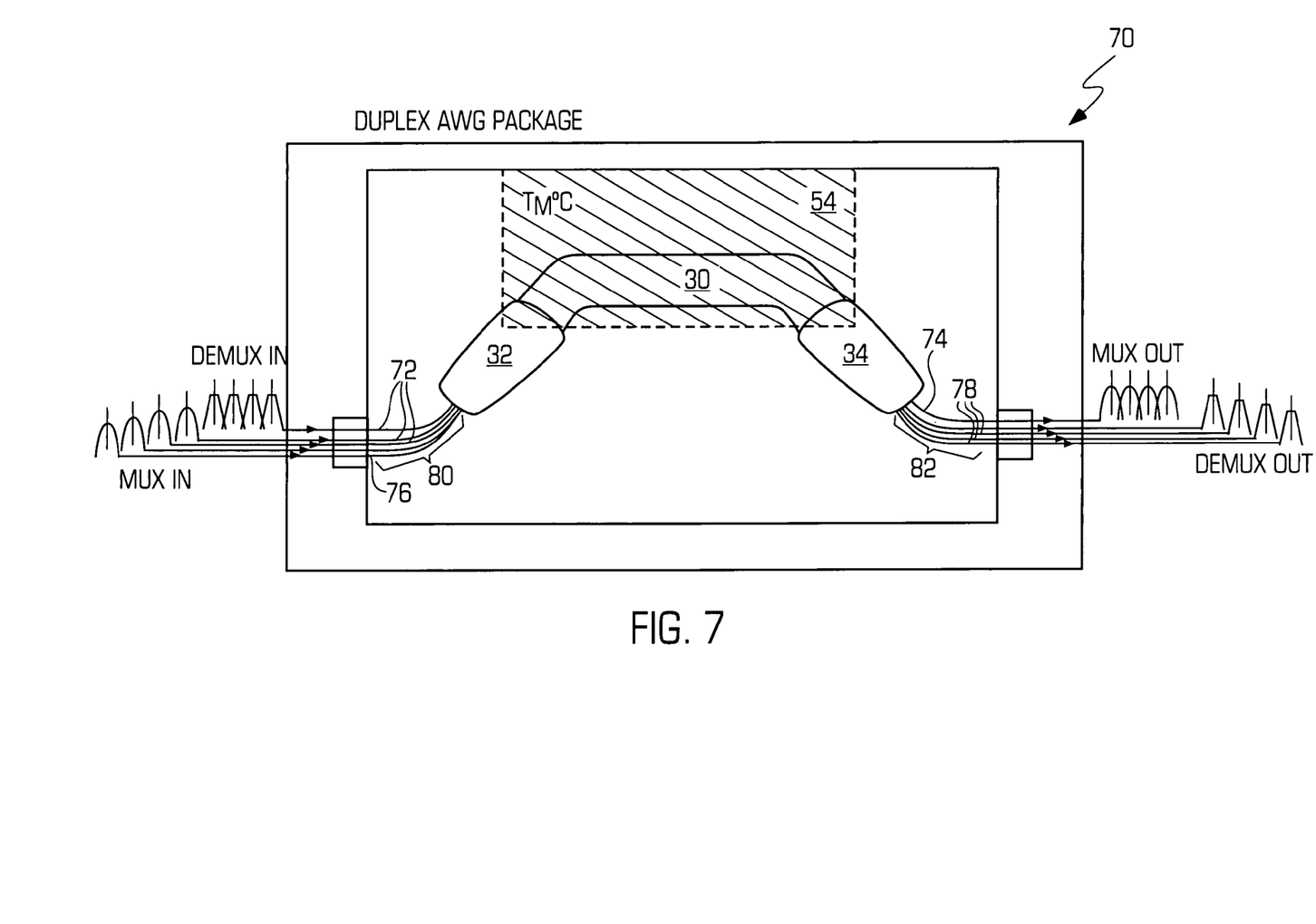
FIG. 7 illustrates a duplex AWG device in accordance with the invention.

FIG. 7 illustrates a duplex AWG device 70 that can simultaneously be used as a MUX and a deMUX by sharing the arrayed waveguide grating region 30 (which controls the wavelengths at the center of each spectral passband). The duplex AWG device 70 is capable of being used as a multiplexer and a demultiplexer at the same time, or operating in a multiplexer mode or a demultiplexer mode at different times. The duplex AWG device 70 meets the different spectral shape characteristics of the MUX and deMUX passbands. Unlike the embodiments of FIG. 5A, FIG. 5B and FIG. 6, the duplex AWG device 70 requires no additional packaging complexity. Moreover, the manufacturing cost is lower than that of FIG. 5 and FIG. 6 because only one arrayed waveguide grating region 30 is used.

As shown, the duplex AWG device 70 has an input region 80 through which signals enter the device and an output region 82 through which signals exit the device. The input region 80 has a first input waveguide set 72 and a second input waveguide set 76. In the embodiment shown, the first input waveguide set 72 carries demultiplexed input signals for which the AWG acts as a filter with a flat-top passband shape. The second input waveguide set 76 carries a multiplexed input signal for which the AWG acts as a filter with a wideband Gaussian passband shape. Each "input waveguide set" includes one or more input waveguides.

The output region 82 has a first output waveguide set 74 and a second output waveguide set 78. In the embodiment shown, the first output waveguide set 74 carries a multiplexed output signal 74 that is a result of the demultiplexed input signals being combined. The second output waveguide set 78 carries demultiplexed output signals that result from the multiplexed input signal. Each "output waveguide set" includes one or more output waveguides.

Figure 8:
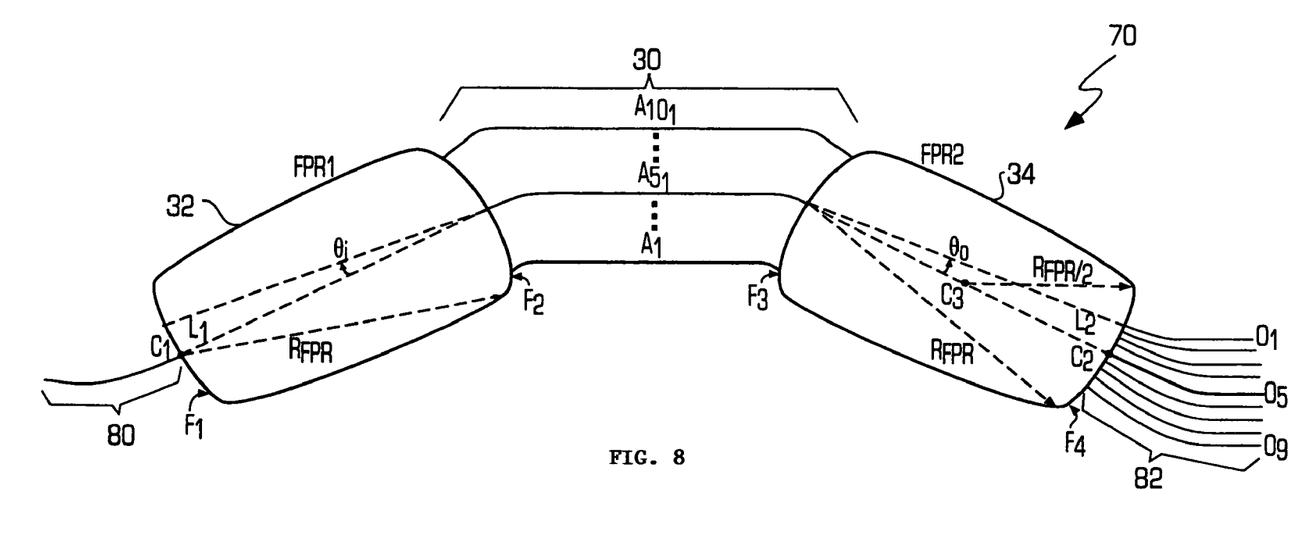
FIG. 8 illustrates the duplex AWG device of FIG. 7 in more detail.
Figure 9A:
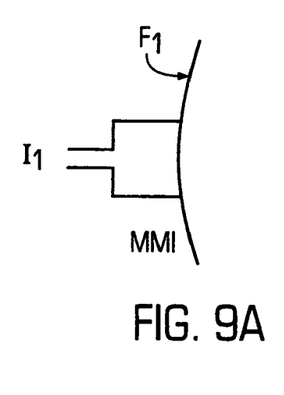
FIGS. 9A, 9B, 9C, and 9D are examples of passband-shaping structures that are useful for creating flat-top or wide-band Gaussian passband shapes.
Figure 9B:
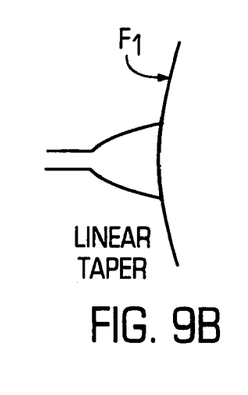
Figure 9C:
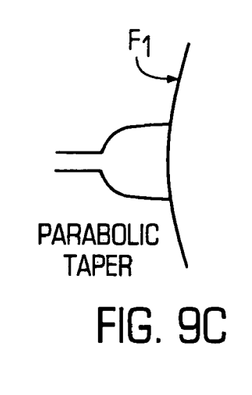
Figure 9D:
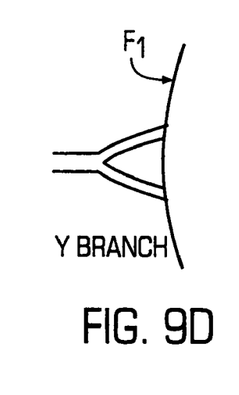

FIG. 8 illustrates the duplex AWG device 70 in more detail. In the AWG, there are one or more input waveguides in the input region 80, a set of output waveguides (shown as O1-O9) in the output region 82, the input FPR 32 and the output FPR 34. The arrayed waveguide grating region 30 includes a set of waveguides (A1-A101) that connect the input FPR 32 and the output FPR 34. The arrayed waveguide grating region 30 is also known as the "waveguide grating" or "phasar." Although FIG. 8 depicts nine output waveguides 42, one input waveguide 18 and 101 array waveguides, these numbers can change depending on the specific design. The input waveguide 18 is coupled to the input face F1 of the input FPR 32 at point C1. This point is the center of curvature with radius $R_{fpr}$ for the output face F2 of the input FPR 32. Thus, all the arrayed waveguides extend out radially from point C1 and are symmetrically oriented about the central array waveguide A51. I1, C1 and A51 can be thought to lie on the straight line L1.

Although the embodiment of FIG. 8 show 101 waveguides in the arrayed waveguide grating region 30, this is not a limitation of the invention and any number of waveguides may be used. Likewise, the invention is not limited to the number of input or output waveguides shown in the embodiment of FIG. 8. The duplex AWG device 70 could be used with any number of channels, any channel spacing, and any passband shape as is convenient or applicable. For example, in one embodiment, the multiplexed signal could be a 16-channel mux signal with 100-Ghz channel spacing and wideband Gaussian filter shape, and the demultiplexed signal could have 32 channels with 100-Ghz channel spacing and a flat-top passband. In another embodiment, both the multiplexed signal and the demultiplexed signal could have 40 channels with 50-Ghz channel spacing, with the multiplexed signal having a wideband Gaussian shape and the demultiplexed signal having a narrowband Gaussian shape.

Although the passband shape and the number of channels may be different for the multiplexed signal and the demultiplexed signal, the channel spacing is the same between the multiplexed signal and the demultiplexed signal as they share the same phasar.

Similarly, on the other side, the array waveguides all have a common aiming point C2, which is located on the output face F4 of the output FPR 34, and which is the center of curvature for face F3 of the output FPR 34 with radius of curvature $R_{fpr}$. Face F4 is also known as the Rowland circle, which has a radius $R_{fpr}/2$, and a center of curvature C3. The output waveguides O1-O9 are positioned along this face F4, as this is the focal plane for the light emerging from the array waveguides. The centers of curvature C2, C3 and the central array waveguide A51 and the central output waveguide O5 can be thought to lie along a straight line L2. There is typically a fixed lateral spacing between the array waveguides at the interface between the array and the slab i.e., at faces F2 and F3. This spacing is known as the pitch P of the grating. As mentioned earlier (see FIG. 3) there is a constant predetermined optical path length difference between adjacent waveguides in the phasar (waveguide array). The optical path length difference is $n_g \Delta L$, which is realized by increasing (or decreasing) the physical path length from one waveguide to the next, as all waveguides in the array are assumed to have the same effective index $n_g$. It is this $\Delta L$ that determines which wavelengths focus on the output channels of face F4, via the following equation:

$$n_g \Delta L = m \lambda_c \qquad \text{(equation 1)}$$

where $n_g$=the effective index of the array waveguides,
   $\lambda_c$=the central output wavelength of the grating, i.e. the wavelength on the central output channel O5, and
   m=an integer number known as the order of the grating.

While the central wavelength of the spectral passband shape at each output is controlled by the array waveguides and the $\Delta L$ spacing between them, the spectral shape itself at the output waveguides is a function of mode shaping structures incorporated at the input and output waveguides. The input waveguide is a channel waveguide, which constitutes of the core material (usually in a square cross-section) formed by standard lithographic techniques, surrounded by cladding material of a lower index of refraction. The cladding material below the core is an oxide layer typically grown from the silicon substrate, while Flame Hydrolysis Deposition (FHD) or Chemical Vapor Deposition (CVD) fabrication processes deposits the upper cladding on the etched core. If the index contrast is such that the index of the core is roughly 0.75% higher than the index of the surrounding cladding and the dimensions of the core are roughly 5 μm wide and 5 μm deep, then in this form the square input waveguides has an approximate Gaussian distribution of the electromagnetic field that satisfies the boundary conditions. In other words, the incoming light field has a mode field that is gaussian in shape at the wavelength of interest (~1550 nm).

Similarly, the output waveguides also have a square cross section and are single-molded. Thus, at the Rowland circle, when the Gaussian mode of the input waveguide is imaged, it convolves with the Gaussian mode of the output waveguide and a Gaussian passband spectral shape is obtained. In practice, this shape can be expanded be expanding the width of the input and output waveguides by tapering them adiabatically. These tapers are then at the end of the input waveguides which connect to the input FPR 32 at face F1 and also at the beginning of the output waveguides which connect to the output FPR 34 at face F4. This expanded Gaussian shape is suitable for the MUX devices that benefit from the wide gaussian FWHM, while the poor crosstalk characteristics of the wide Gaussian tails are of no concern. For the deMUX devices, the narrower Gaussian shape is more preferable as the crosstalk characteristics become paramount when separating wavelength signals.

FIGS. 9A, 9B, 9C, and 9D depict examples of passband-shaping structures that may be used in situations where it is desirable for the AWG deMUX to have a flat-top or wideband Gaussian passband shape. Various methods have been proposed for achieving a flat-top passband but the most successful ones are the ones that involve creating a double-peaked mode field at the input face F1. When this double-peaked mode field is imaged at face F4, it convolves with the single mode output waveguide and results in flat-top passband. One technique for creating this double-peaked mode field at the input is with a short parabolic shape taper which expands non-adiabatically giving rise to a fundamental and a second order mode which together form the double-peaked field. Another technique involves the use of an MMI (multimode interference) structure, which too gives rise to higher order modes which interact to result in the desired shape.

As mentioned above, the desired spectral shape can easily be controlled by the input and output structures independent of the array waveguides, while the wavelengths at the center of each of those passbands at the different outputs is controlled by the array waveguides. Hence, a single phasar can be used to control the wavelengths for both a MUX as well as a de-MUX, while different input and output structures could be used to control the different passband requirements for the two.

The design of the duplex AWG device 70 can be understood via the grating equation for arrayed waveguide gratings. Referring to FIG. 8, the grating equation can be represented as a condition for equal phase at the focus point on the output face F4 of the output FPR 34, i.e. equation 2 is the condition that needs to be satisfied by all the rays emerging from the array waveguides and converging to a point on face F4 for a particular wavelength λ.

$$(2\pi/\lambda)n_{FPR}P(\sin\theta_I - \sin\theta_o) + (2\pi/\lambda)n_g\Delta L = 2\pi m \quad \text{(equation 2)}$$

where $\theta_I$=the angle made by the input waveguide of concern with respect to the line L1 that is normal to the grating on the input side of the AWG;

$\theta_o$=the angle made by the output waveguide of concern with the normal line L2 at the output FPR2;

$n_{FPR}$=the effective index of the FPR region;

$n_g$=the effective index of the array waveguides;

m=the order of the grating;

P is the Pitch; and

ΔL is the path length difference between adjacent array waveguides.

The first term on the left-hand side of equation 2 is from the grating equation for an ordinary grating such as a bulk grating, whereas the second term is the contribution to the phase from the arrayed waveguides. Equation 2 reduces to Eq 1, when we consider the central input and the central output waveguide, in which case both $\theta_I = \theta_o = 0$, and $\lambda = \lambda_c$.

Figure 10A:
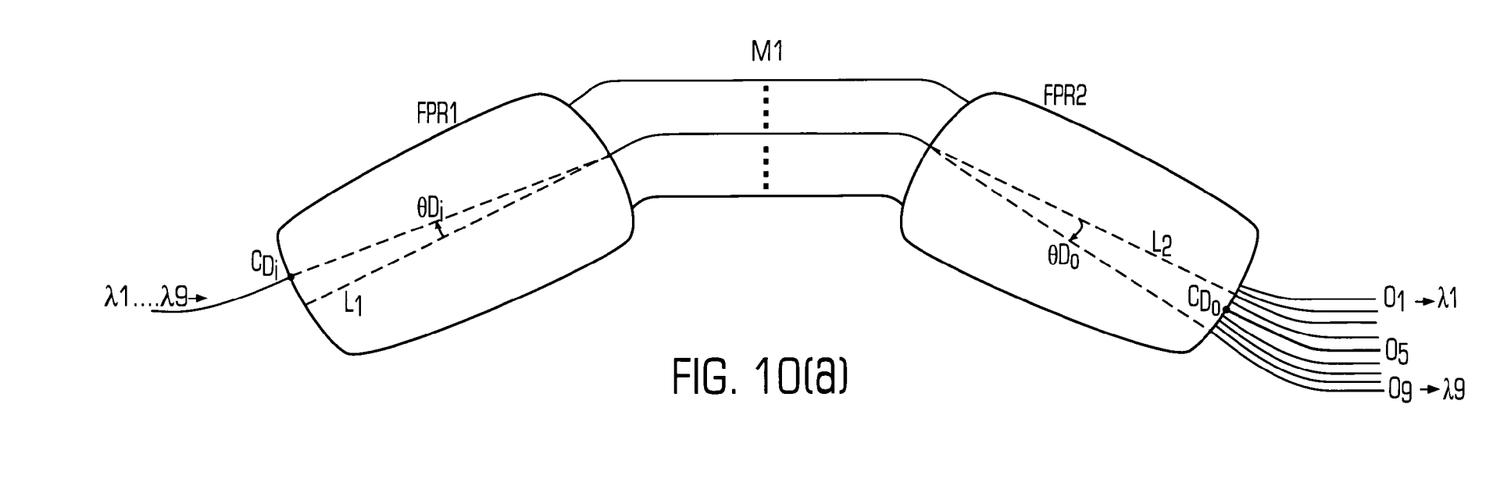
FIGS. 10A and 10B illustrate the deMUX portion and the MUX portion of the duplex AWG device.

FIG. 10A illustrates the deMUX part of the duplex AWG device 70 in accordance with an embodiment of the invention. The duplex AWG device 70 has its central input waveguide position not on the normal line L1 (like standard simplex AWGS) but off-center at position $C_{Di}$ which makes an angle $\theta_{Di}$ with L1. Similarly, the output waveguides O1-O9 are symmetrically placed about central output waveguide O5 but the output waveguide O5 is not in line with L2. The output waveguide O5 is off-center at position $C_{Do}$ making an angle $\theta_{Do}$ with L2. The structure at the input and output waveguides for the de-MUX are the ones required to achieve a flat-top passband.

Figure 10B:
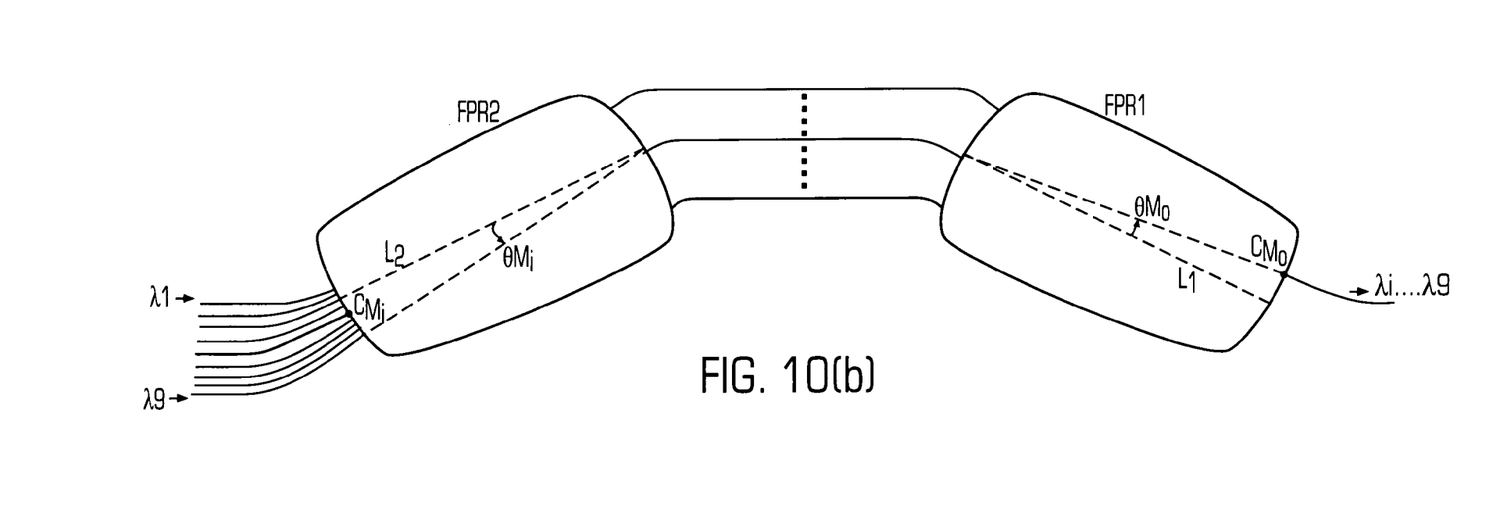

FIG. 10B illustrates a MUX part of the duplex AWG device 70 in accordance with an embodiment of the invention. The multiplexer of FIG. 10B is a reflection of the demultiplexer in FIG. 10A about the axis M1. Thus, the input and output waveguides have reversed sides but remain off-center with the same angles as in FIG. 10A. More specifically, the point $C_{Di}$ in FIG. 10A has been mirrored to point $C_{Mo}$ in FIG. 10B (i.e., $\theta_{Di} = \theta_{Mo}$) with angle $\theta_{Mo}$ to the line L1 which itself is equivalent to line L2 in FIG. 10A as they are both normals to the same grating. A similar transformation has happened for the output waveguides in FIG. 10A to FIG. 10B. If the phasar in FIG. 10A, which is symmetric about the axis M1, is mirrored about the axis M1, it results in exactly the same phasar. In other words, the arrayed waveguide grating regions 30 in FIG. 10A and 10B are identical. Hence, equation 2 holds the same condition for a wavelength entering from point $C_{Mo}$ and exiting at point $C_{Mi}$. Thus, the same wavelengths λ1, ... λ9 exit the output waveguides in both FIGS. 10A and 10B. At this point, one could imagine, in FIG. 10B, that instead of the wavelengths entering from point $C_{Mo}$ in FIG. 10B and separating out on the output FPR side, the wavelengths actually enter from the output FPR side and combine to the point $C_{Mo}$ in FPR1. Essentially, an AWG operating as a de-multiplexer in one direction of light flow can operate as a multiplexer for the same wavelengths in the opposite direction. The only difference is that in FIG. 10B, the input and output waveguide structures have been replaced by the ones required to create a wide-Gaussian MUX passband shape.

Figure 10C:
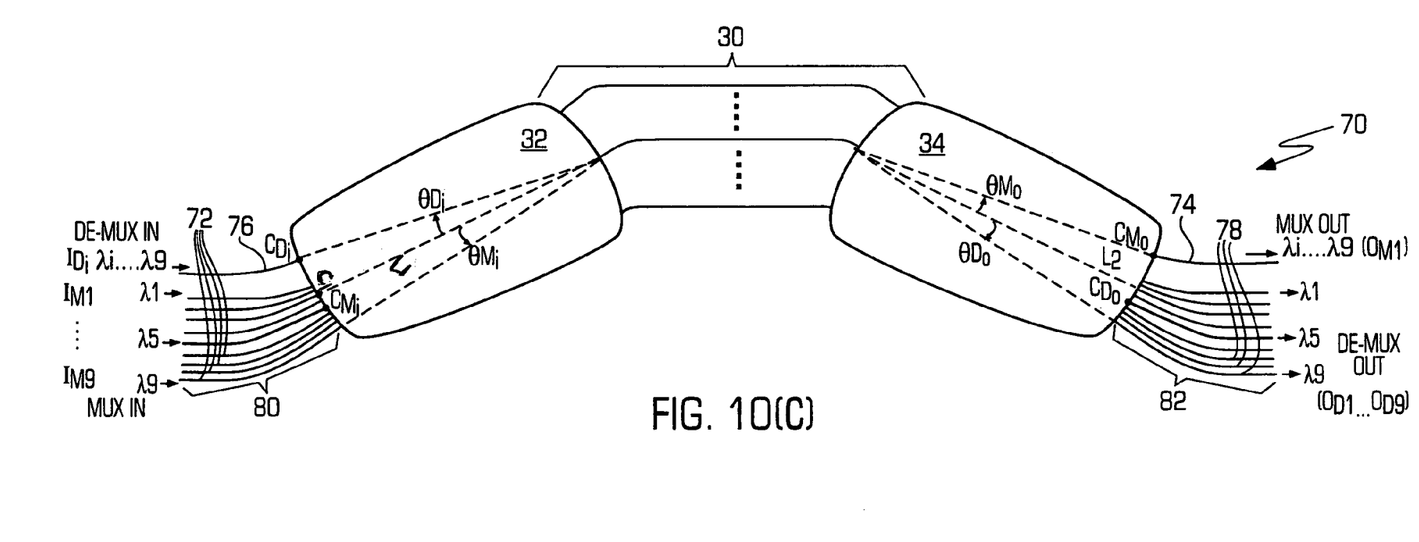
FIG. 10C illustrates the deMUX/MUX construction of the duplex AWG device.

FIG. 10C shows a duplex AWG device 70 that is a combination of the constructions in FIGS. 10A and 10B. As shown in the general diagram of FIG. 7, the duplex AWG device 70 has the first input waveguide set 72, the second input waveguide set 76, the first output waveguide set 74, and the second output waveguide set 78. The AWG device 70 acts a DeMUX for multiplexed input signal $I_{D1}$, and outputs demultiplexed output signals $O_{D1}$ to $O_{D9}$. The AWG device 70 also acts as a MUX for demultiplexed input signals $I_{M1}$ to $I_{M9}$ and outputs a multiplexed output signal $O_{M1}$ for the same wavelengths λ1 to λ9. The wavelength offsets from the desired ITU grid can be minimized by optimizing the order ΔL and input and output angles. The positions of the input and output waveguides should be designed such that they both fall well within the flat part of the far-field diffraction pattern of the AWG's array waveguides and not the slopes of the pattern in order to avoid excess losses.

The use of input waveguides which are off-center in the FPRs (off the normal line) can lead to comatic aberrations in the imaging of double-peaked mode fields as used in the de-mux passband shaping structures. This problem can be mitigated by chirping the pitch of the AWG arrayed waveguides according to the description in U.S. Pat. No. 6,768,842 B2, which is incorporated by reference herein. In the AWG device 70 of FIG. 10C, only one set of AWG temperature control is needed as the phasar is shared between the two sets of inputs and outputs, thereby avoiding packaging complexities.

Although the preferred embodiment of the present invention has been described in detail hereinabove, it should be clearly understood that many variations and/or modifications of the basic inventive concepts herein taught which may appear to those skilled in the present art will still fall within the spirit and scope of the present invention.

What is claimed is:

1. An optical device comprising:
   an input region including a first input waveguide set and a second input waveguide set coupled to a free propagation region (FPR), wherein each of the first and second input waveguide set has a central input waveguide that is unaligned with a first line L1 that extends through a center of the FPR, and wherein the first and the second input waveguide sets are capable of operating for the same wavelengths;
   an output region including a first output waveguide set and a second output waveguide set, wherein each of the first and second output waveguide set has at least one output waveguide; and
   an arrayed waveguide grating between the input region and the output region such that signals that travel from the input region to the output region share the arrayed waveguide grating.

2. The optical device of claim 1, wherein the first input waveguide set carries demultiplexed input signals that become multiplexed while passing through the arrayed waveguide grating and exit the optical device as a multiplexed output signal.

3. The optical device of claim 2, wherein the second input waveguide set carries a multiplexed input signal that becomes demultiplexed while passing through the arrayed waveguide grating and exits the optical device as demultiplexed output signals.

4. The optical device of claim 3, wherein the demultiplexed input signals become multiplexed and the multiplexed input signal becomes demultiplexed by passing through the arrayed waveguide grating simultaneously.

5. The optical device of claim 1, wherein the first input waveguide set carries demultiplexed input signals that pass through the arrayed waveguide grating and exits the optical device through the first output waveguide set as a multiplexed output signal.

6. The optical device of claim 5, wherein the second input waveguide set carries a multiplexed input signal that passes through the arrayed waveguide grating and exits the optical device through the second output waveguide set as demultiplexed output signals.

7. The optical device of claim 1, wherein signals entering the first input waveguide set pass through a first AWG spectral passband and the signals entering the second input waveguide set pass through a second AWG spectral passband, wherein the first and second AWG spectral passbands have different shapes.

8. The optical device of claim 1, wherein signals passing through the first output waveguide set have a first AWG spectral passband and the signals passing through the second output waveguide set pass through a second AWG spectral passband, wherein the first and second AWG spectral passbands have different shapes.

9. The optical device of claim 1, wherein signals passing through the first output waveguide set travel through a filter having a wide-Gaussian passband shape and signals passing through the second output waveguide set travel through a filter having a flat-top passband shape that is narrower than the Gaussian passband shape.

10. The optical device of claim 1, wherein the FPR is an input FPR located between the input region and the arrayed waveguide grating, further comprising:
    an output FPR between the arrayed waveguide grating and the output region.

11. The optical device of claim 10, wherein a center point on an input face of the input FPR and a center waveguide of the arrayed waveguide grating form the first line L1, and wherein the central input waveguide of the first input waveguide set enters the input FPR from a position that makes an angle $\theta_{Di}$ with respect to L1.

12. The optical device of claim 11, wherein the central input waveguide of the second input waveguide set enters the input FPR from a position that makes an angle $\theta_{Mi}$ with respect to L1.

13. The optical device of claim 12, wherein a center point on an output face of the output FPR and the center waveguide of the arrayed waveguide grating form a second straight line L2, and wherein a central output waveguide of the second output waveguide set exits the output FPR from a position that makes an angle $\theta_{Do}$ with respect to L2, and wherein $\theta_{Do}$ is substantially equal to $\theta_{Mi}$.

14. The optical device of claim 13, wherein a central output waveguide of the first output waveguide set exits the output FPR from a position that makes an angle $\theta_{Mo}$ with respect to L2, and wherein $\theta_{Mo}$ is substantially equal to $\theta_{Di}$.

15. The optical device of claim 10, wherein a central output waveguide of the first output waveguide set and a central output waveguide of the second output waveguide set exit the output FPR through a point on an output face of the FPR that is away from a center of the output face.

16. The optical device of claim 10, wherein a center point on an output face of the output FPR and the center waveguide of the arrayed waveguide grating form a second straight line L2, and wherein a central output waveguide of the second output waveguide set exits the output FPR from a position that makes an angle $\theta_{Do}$ with respect to L2.

17. The optical device of claim 16, wherein a central output waveguide of the first output waveguide set exits the output FPR from a position that makes an angle $\theta_{Mo}$ with respect to L2.

18. The optical device of claim 10, wherein a central input waveguide of the first input waveguide set and a central input waveguide of the second input waveguide set enter the input FPR through a point on an input face of the FPR that is away from a center of the input face.

19. The optical device of claim 1, wherein the signals that travel from the input region to the output region have different number of channels.

20. A method of making an optical device, the method comprising:
    forming an input region including a first input waveguide set and a second input waveguide set that are coupled to a free propagation region (FPR), wherein each of the first and second input waveguide set has a central input waveguide that is unaligned with a first line L1 that extends through a center of the FPR, and wherein the first and the second input waveguide sets are capable of operating for the same wavelengths;
    forming an output region including a first output waveguide set and a second output waveguide set, wherein each of the first and second output waveguide set has at least one output waveguide; and
    forming an arrayed waveguide grating between the input region and the output region, such that signals that travel from the input region to the output region share the arrayed waveguide grating.

21. An optical device comprising:
    a first input waveguide set that receives demultiplexed input signals and having a first central input waveguide;
    a second input waveguide set that receives a multiplexed input signal and having a second central input waveguide, wherein the multiplexed input signal includes the same wavelength as one of the demultiplexed input signals;

a free propagation region (FPR) coupled to the first input waveguide set and the second input waveguide set such that the first central input waveguide and the second central input waveguide are unaligned with a first line L1 that extends through a center of the FPR, and an arrayed waveguide grating that is capable of multiplexing the demultiplexed input signals to form a multiplexed output signal and demultiplexing the multiplexed input signal to form demultiplexed output signals simultaneously.

22. An optical device comprising:

a first input waveguide set and a second input waveguide set, wherein each of the first and second input waveguide set has at least one input waveguide, wherein the first input waveguide set is capable of receiving demultiplexed input signals simultaneously as the second input waveguide set receives a multiplexed input signal, the demultiplexed input signals having a substantially constant wavelength separation and including the same wavelengths as the wavelengths in the multiplexed input signal;

a first output waveguide set and a second output waveguide set, wherein each of the first and second output waveguide set has at least one output waveguide; and an arrayed waveguide grating positioned between the first input waveguide and the first output waveguide and between the second input waveguide and the second output waveguide.

23. A method of making an optical device, the method comprising:

forming a first input waveguide set and a second input waveguide set, wherein each of the first and second input waveguide set has at least one input waveguide such that the first input waveguide set is capable of receiving demultiplexed input signals simultaneously as the second input waveguide set receives a multiplexed input signal, the demultiplexed input signals having a substantially constant wavelength separation and including the same wavelengths as the wavelengths in the multiplexed input signal;

forming a first output waveguide set and a second output waveguide set, wherein each of the first and second output waveguide sets has at least one output waveguide; and forming an arrayed waveguide grating positioned between the first input waveguide and the first output waveguide and between the second input waveguide and the second output waveguide.

24. The optical device of claim 23, wherein the first output waveguide set and the second output waveguide set each has a substantially constant wavelength separation.

25. The method of claim 23, wherein the first output waveguide set and the second output waveguide set each has a substantially constant wavelength separation.

26. The optical device of claim 10, wherein the first output waveguide set and the second output waveguide set are coupled to the output FPR, and wherein each of the first and second output waveguide set has a central output waveguide that is unaligned with a second line L2 that extends through a center of the output FPR.

27. The optical device of claim 1, wherein the first input waveguide set and the second input waveguide set are positioned next to each other without intermixing.

28. The optical device of claim 1, wherein the first output waveguide set and the second output waveguide set are positioned next to each other without intermixing.

* * * * *